US006201795B1

(12) United States Patent
Baum et al.

(10) Patent No.: US 6,201,795 B1
(45) Date of Patent: Mar. 13, 2001

(54) METHOD AND APPARATUS FOR MITIGATING INTERFERENCE IN A COMMUNICATION SYSTEM

(75) Inventors: Kevin L. Baum, Rolling Meadows; Bruce D. Mueller, Palatine; Mark C. Cudak, McHenry, all of IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 08/897,398

(22) Filed: Jul. 21, 1997

Related U.S. Application Data

(63) Continuation of application No. 08/742,278, filed on Oct. 31, 1996, now abandoned, and application No. 08/359,220, filed on Dec. 19, 1994, now abandoned.

(51) Int. Cl.[7] ........................................................ H04J 3/14
(52) U.S. Cl. ..................... 370/252; 370/230; 370/235; 370/332; 375/346
(58) Field of Search ................................. 370/252, 281, 370/330, 332, 333, 335, 337, 342, 430, 458, 229, 230, 231, 235, 236; 375/346, 349; 455/62, 63, 67.1, 438, 439, 454, 512

(56) References Cited

U.S. PATENT DOCUMENTS

| 4,750,036 | * | 6/1988 | Martinez | 375/200 |
|---|---|---|---|---|
| 5,042,082 | * | 8/1991 | Dahlin | 455/33.2 |
| 5,175,867 | * | 12/1992 | Wejke et al. | 455/33.2 |
| 5,309,503 | * | 5/1994 | Bruckert et al. | 455/33.2 |
| 5,345,600 | * | 9/1994 | Davidson | 370/95.3 |
| 5,355,514 | * | 10/1994 | Borg | 370/95.3 |
| 5,412,658 | * | 5/1995 | Arnold et al. | 370/69.1 |
| 5,507,008 | * | 4/1996 | Kanai et al. | 455/62 |
| 6,011,787 | * | 1/2000 | Nakano et al. | 370/335 |
| 6,018,544 | * | 1/2000 | Kotzin et al. | 370/333 |
| 6,018,663 | * | 1/2000 | Karlsson et al. | 370/332 |

FOREIGN PATENT DOCUMENTS

WO 93/19537   9/1993   (WO) .............................. H04B/7/26

OTHER PUBLICATIONS

McVoy, D. Stevens and Stern, Joseph L., "Cable and Satellite Home Distribution Systems", Television Engineering Handbook, Chapter 9, Section 9.9, McGraw Hill, 1992.
Generic Criteria for Version 0.1 Wireless Access Communications Systems (WACS) published by Bellcore, 193 (TR–INS–0011313), specifically Chapter 4 (Oct., 1993).

* cited by examiner

Primary Examiner—Douglas W. Olms
Assistant Examiner—Shick Hom
(74) Attorney, Agent, or Firm—Joanne N. Pappas

(57) ABSTRACT

A communication system (100) that includes a base unit (101) and a subscriber unit (e.g., 103) employs a method (400) and apparatus (101) for mitigating interference (135) therein. The base unit (101) receives an uplink communication signal from the subscriber unit (103) at an uplink frequency and conveys a downlink communication signal to the subscriber unit (103) at a downlink frequency. Upon receiving (403) an uplink communication signal from the subscriber unit (103), the base unit (101) determines (405) a quality metric for the uplink frequency. When the quality metric is below a quality threshold (407), the base unit (101) and the subscriber unit (103) transfer (415) the communication signal to an alternate uplink frequency, while the downlink frequency remains unchanged.

2 Claims, 4 Drawing Sheets

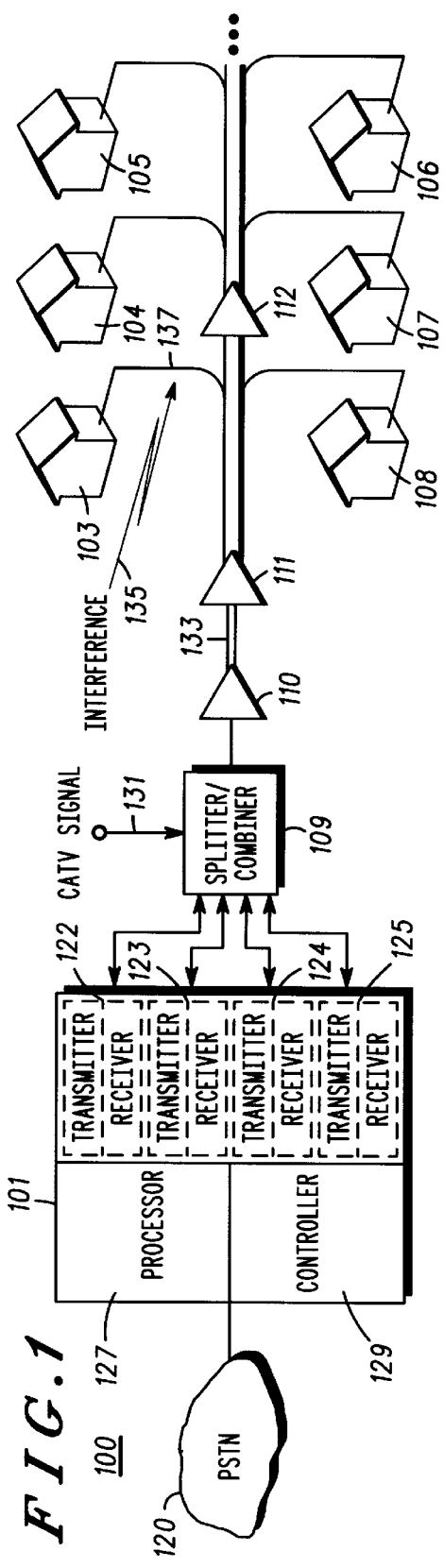
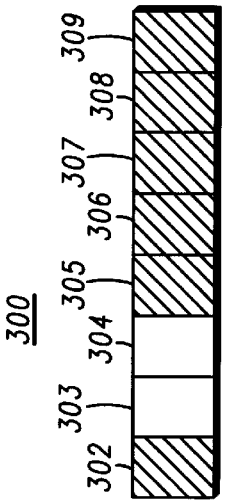
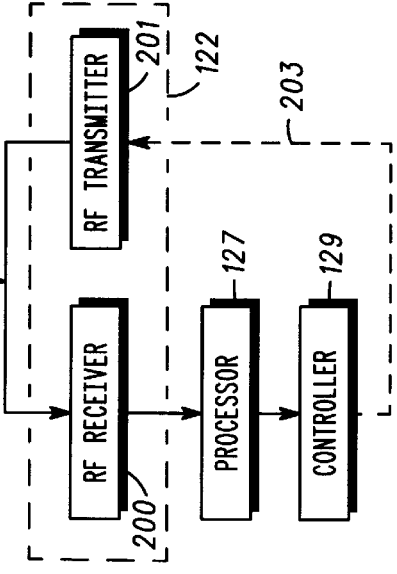

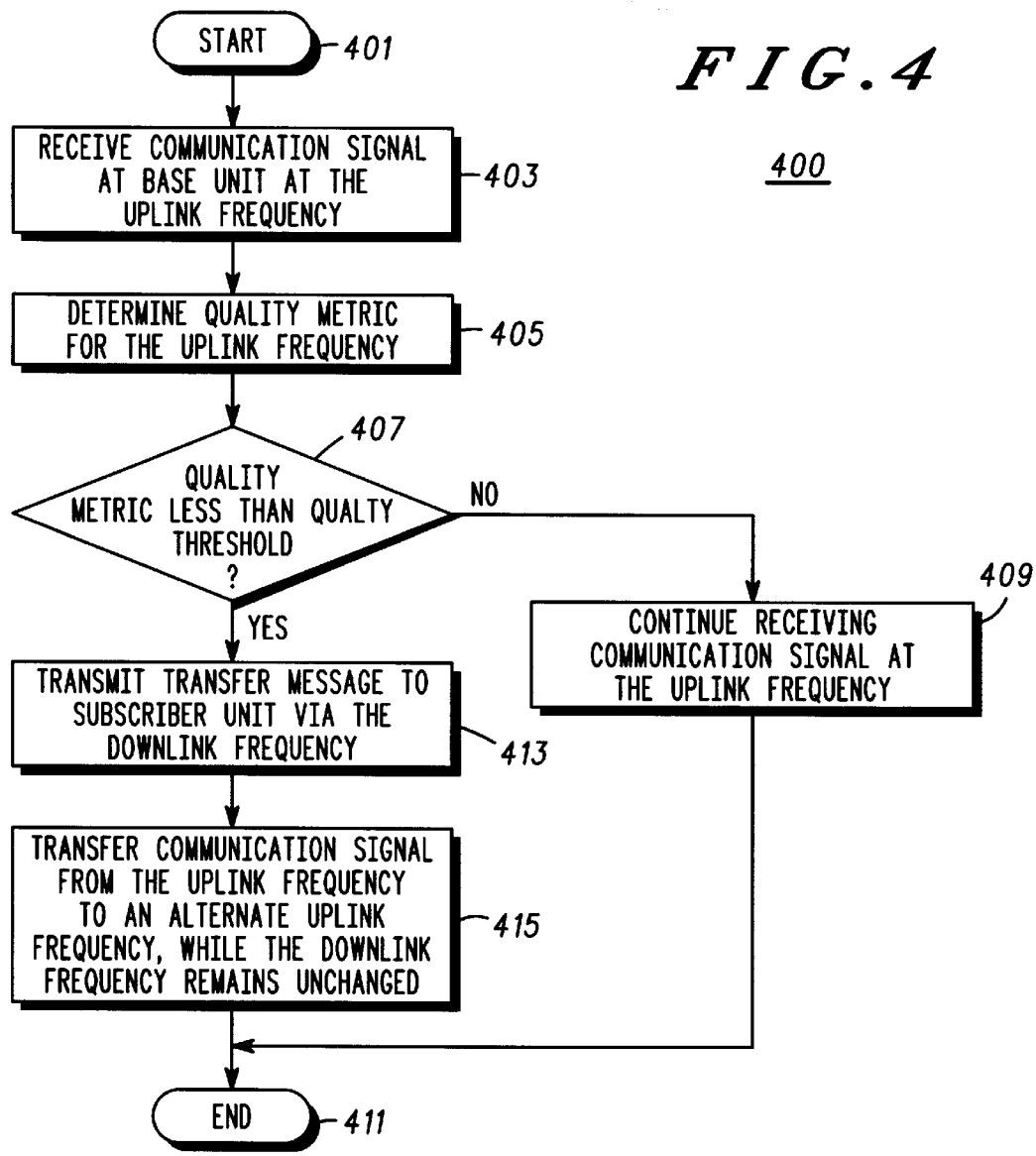

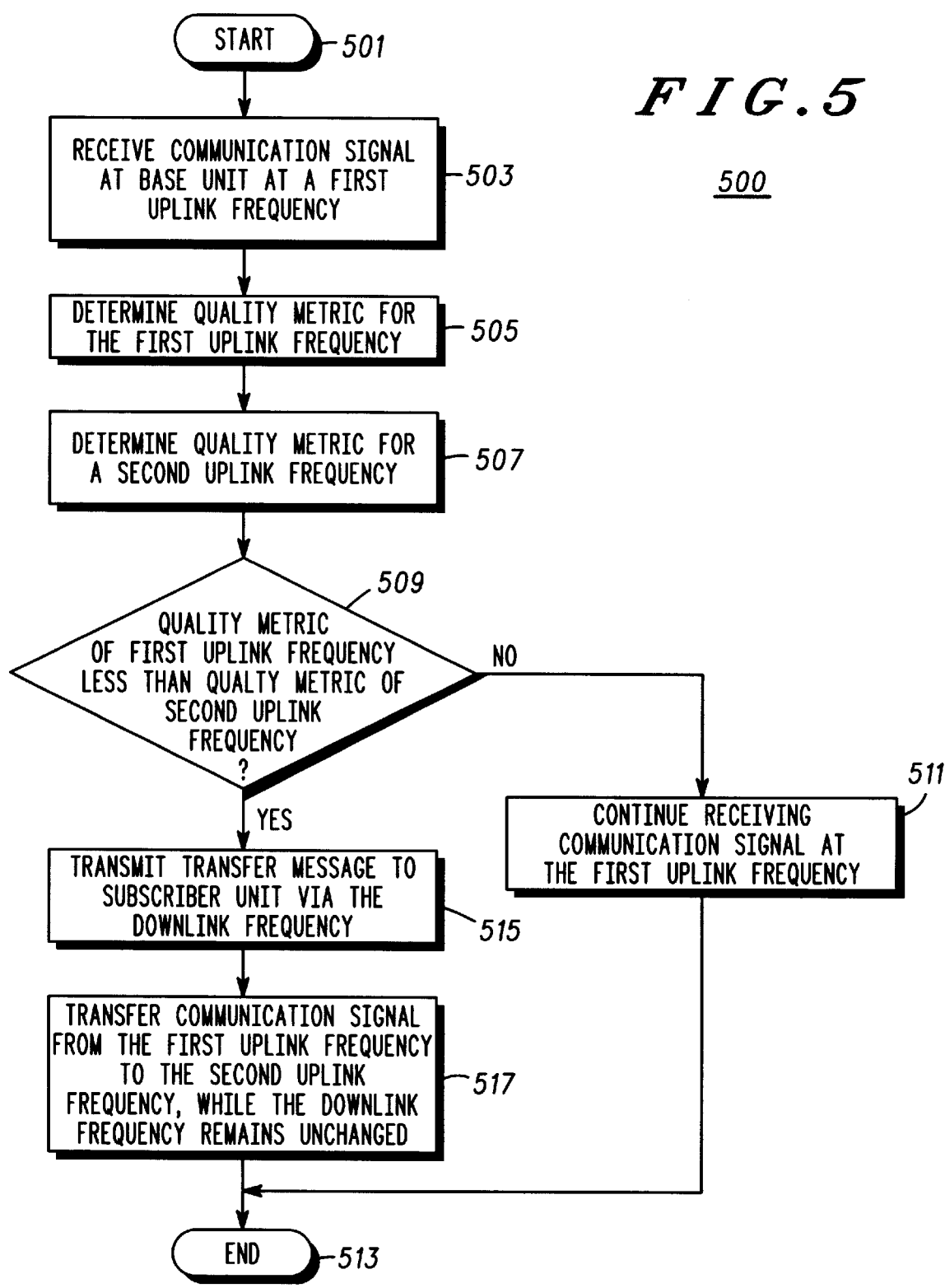

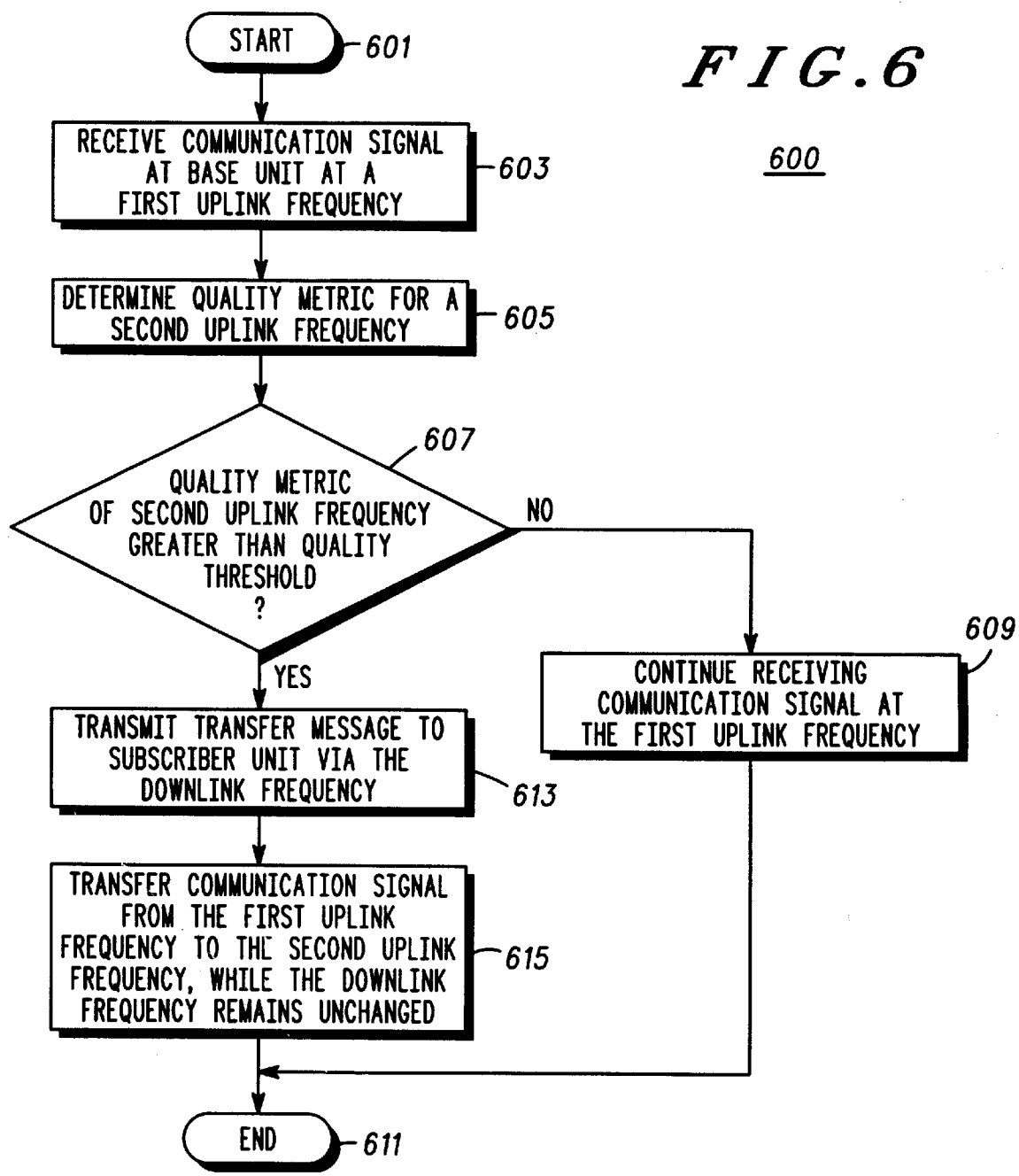

METHOD AND APPARATUS FOR MITIGATING INTERFERENCE IN A COMMUNICATION SYSTEM

This is a continuation of application Ser. No. 08/742,278, filed Oct. 31, 1996 now abandoned and application Ser. No. 08/359,220, filed Dec. 19, 1994 now abandoned.

FIELD OF THE INVENTION

The present invention relates generally to communication systems and, in particular, to mitigating interference in a two-way radio frequency communication system.

BACKGROUND OF THE INVENTION

Communication systems are known to comprise a plurality of subscriber units that communicate with one or more base units via radio frequency channels. One such communication system is a two-way cable communication system. In a two-way cable communication system, the subscriber units are fixed transceivers that are located in the residences of system subscribers and are connected to a base unit through existing cable television infrastructure equipment. Each subscriber unit conveys information to the base unit at an uplink frequency and the base unit conveys information to each subscriber unit at a downlink frequency. The uplink frequency and the downlink frequency together comprise a radio frequency channel.

During the transmission of a communication signal from a subscriber unit to the base unit, interference (typically known as ingress interference) may be coupled onto the communication signal due to radiation of interfering signals at, or near, the uplink frequency from a nearby wireless transmitter or due to conduction of interfering signals at, or near, the uplink frequency from electronic devices, such as televisions or video cassette recorders (VCRs), directly connected to the cable infrastructure equipment. The majority of ingress interference is typically generated at frequencies located at the lower end of the cable communication uplink frequency band (e.g., 5–15 MHz of the 5–42 MHz band). When present, the ingress interference degrades the signal quality of the communication signal received by the base unit.

Two known techniques for mitigating the effects of ingress interference in a cable communication system are high frequency transmission and source isolation. The high frequency transmission technique allows uplink transmissions to occur only at uplink frequencies residing at the upper end of the cable communication uplink frequency band (e.g., 20–42 MHz) and out of the typical frequency band of the ingress interference. Thus, this technique is spectrally inefficient because it allows only for uplink communications in approximately the upper one-half of the available frequency range, thereby significantly limiting system capacity. The source isolation technique allows uplink transmissions at frequencies throughout the complete uplink frequency band; however, it burdens the communication system by requiring the base unit to first locate, and then isolate, sources of ingress interference when poor uplink signal quality is detected. In addition, isolation of the interference sources (e.g., by disconnecting uplink service to a home or a neighborhood) disrupts two-way communication service to the subscribers located in the geographical areas of the ingress interference sources.

Therefore, a need exists for a method and apparatus that mitigate interference in a communication system without detrimentally impacting system capacity and without creating any disruptions in service.

BRIEF DESCRIPTION OF THE DRAWINGS

FIG. 1 illustrates a two-way cable communication system in accordance with the present invention.

FIG. 2 illustrates an exemplary portion of a base unit in accordance with the present invention.

FIG. 3 illustrates a time frame containing a plurality of time slots in accordance with the present invention.

FIG. 4 illustrates a logic flow diagram of steps executed to mitigate interference in a communication system in accordance with a preferred embodiment of the present invention.

FIG. 5 illustrates a logic flow diagram of steps executed to mitigate interference in a communication system in accordance with a first alternate embodiment of the present invention.

FIG. 6 illustrates a logic flow diagram of steps executed to mitigate interference in a communication system in accordance with a second alternate embodiment of the present invention.

DESCRIPTION OF A PREFERRED EMBODIMENT

Generally, the present invention encompasses a method and apparatus for mitigating interference in a communication system that includes a base unit and a subscriber unit. The base unit conveys a downlink communication signal to the subscriber unit at a downlink frequency and the subscriber unit conveys an uplink communication signal to the base unit at an uplink frequency. Upon receiving the uplink communication signal from the subscriber unit, the base unit determines a quality metric for the uplink frequency. When the quality metric is below a quality threshold, the base unit and the subscriber unit transfer the communication signal to an alternate uplink frequency, while the downlink frequency remains unchanged. By transferring the communication signal from one uplink frequency to another uplink frequency in this manner, the present invention reduces the interference affecting the uplink communication signal without disrupting downlink communications, in contrast to interference isolation methods of the prior art.

The present invention can be more fully described with reference to FIGS. 1–6. FIG. 1 illustrates an exemplary two-way cable communication system 100 in accordance with the present invention. The cable communication system 100 includes a base unit 101, a plurality of subscriber units 103–108, and cable infrastructure equipment. The cable infrastructure equipment preferably includes, inter alia, a splitter/combiner 109, bi-directional amplifiers 110-112, coaxial cables (e.g., 137), and an optical fiber 133. As shown, the base unit 101 is preferably coupled to the public-switched telephone network (PSTN) 120.

In a preferred embodiment, the base unit includes a plurality of transceivers 122–125, a processor 127, and a controller 129. Each of the transceivers 122–125 preferably comprises a radio frequency transmitter that transmits communication signals at downlink frequencies in the frequency range of 50–750 MHz and a radio frequency receiver that receives communication signals at uplink frequencies in the frequency range of 5–42 MHz. In an alternate embodiment, the transceivers 122–125 might operate in any one of the known radio frequency bands. In a preferred embodiment, the processor 127 and the controller 129 preferably comprise a common digital signal processor. However, in an alternate embodiment, the controller 129 might comprise an independent digital signal processor or a microprocessor.

In a preferred embodiment, each subscriber unit 103–108 is coupled to the base unit 101 via the bi-directional amplifiers 110–112, coaxial cables (e.g., 137), and the optical fiber 133. Each subscriber unit 103–108 preferably comprises a radio frequency transceiver located in a system subscriber's residence. However, in an alternate embodiment that does not depend on cable interfaces, each subscriber unit 103–108 might comprise a two-way radio or radiotelephone.

Operation of the two-way cable communication system 100 occurs as follows in accordance with the present invention. A subscriber unit (e.g., 103) transmits an uplink radio frequency (RF) communication signal to the base unit 101 at an uplink frequency via the cable infrastructure equipment. In a preferred embodiment, the two-way cable communication system 100 comprises a time division multiple access (TDMA) communication system and the uplink communication signal comprises a digitally modulated voice or data signal contained within a respective time slot of a time division multiplexed (TDM) frame structure. In an alternate embodiment, the two-way cable communication system 100 might comprise a frequency division multiple access (FDMA) communication system and the uplink communication signal might comprise an analog, or digitally, modulated voice or data signal transmitted in a frequency division multiplexed (FDM) format.

During the transmission of the uplink communication signal, interference 135 (e.g., ingress interference) is coupled into the coaxial cable 137, or any of the other elements 110–112, 109, 133 of the cable infrastructure equipment, either through conduction or radiation. For example, the interference 135 might be generated at the current uplink frequency, or in a bandwidth that includes the current uplink frequency, by a nearby radio transmitter radiating energy in the uplink frequency range. The radiated energy is then coupled into the cable 137, thereby creating the interference 135. The interference 135 might also be generated by electronic devices (e.g., televisions or VCRs) directly connected to the cable infrastructure equipment. In this case, the interference 135 is conductively coupled through a cable to the cable infrastructure equipment and onto the uplink communication signal.

A receiver section of a transceiver (e.g., 122) at the base unit 101 receives the uplink communication signal, including the interference 135, from the cable infrastructure equipment and provides a baseband representation of the received signal to the processor 127. The processor 127 measures a signal quality metric for the received communication signal and, in a preferred embodiment, compares the quality metric to a predetermined quality threshold. In the preferred embodiment, the signal quality metric comprises either a signal-to-noise ratio (S/N) or a carrier-to-interference ratio (C/I). In an alternate embodiment, the signal quality metric might be related (e.g., inversely) to a bit error rate or a word error rate. In yet another embodiment, the quality metric might be based on a level of interference measured at a frequency substantially adjacent to the current uplink frequency by an alternate transceiver 123–125 at the base unit 101. By measuring the level of interference at a frequency substantially adjacent to the current uplink frequency, the base unit 101 can use the measured interference first to approximate the level of interference (I) present at the current uplink frequency and then to compute the signal quality metric (e.g., C/I) for the current uplink frequency. The predetermined quality threshold is preferably selected to maintain a bit error rate of less than $10^{-6}$.

When the quality metric is below the quality threshold, the controller 129 generates a transfer message and the base unit 101 transmits the transfer message to the subscriber unit 103 at a downlink frequency. The transfer message directs the subscriber unit 103 to transfer the uplink communication signal from the current uplink frequency to an alternate uplink frequency. As shown in FIG. 1, the transfer message, and any other downlink communication signals, might be combined in the splitter/combiner 109 with a cable television (CATV) signal 131 that provides cable television service to CATV subscribers.

Once the subscriber unit 103 receives the transfer message from the base unit 101, the subscriber unit 103 and the base unit 101 transfer the uplink communication signal to the alternate uplink frequency, while the downlink frequency remains unchanged. That is, the subscriber unit 103 changes its transmit frequency from the current uplink frequency to the alternate uplink frequency and the base unit 101 changes its receive frequency from the current uplink frequency to the alternate uplink frequency. The transfer allows the uplink communication signal to be conveyed at an uplink frequency outside the bandwidth of the interference 135. However, distinct from traditional two-way communication systems, which transfer both the uplink and the downlink frequencies during a typical handoff of a communication signal, the transfer of the uplink frequency is independent of any change in the downlink frequency. Thus, the present invention provides for transferring the uplink frequency to mitigate the effects of interference without disrupting communications present at the downlink frequency.

FIG. 2 illustrates an exemplary portion of the base unit 101 in accordance with the present invention. The exemplary portion of the base unit 101 includes a transceiver 122, the processor 127, and the controller 129. As noted above, the transceiver 122 includes an RF receiver 200 and an RF transmitter 201. The receiver 200 includes known front end and back end circuitry such as downconverters, filters, and amplifiers. The transmitter 201 is known and includes upconverters, filters, and amplifiers.

As shown, the receiver 200 receives the uplink communication signal from the splitter/combiner 109 of the cable infrastructure equipment. Upon receiving the uplink communication signal, the receiver 200 downconverts and processes the uplink communication signal to produce a digital baseband representation of the received signal. The digital baseband representation is then provided to the processor 127. In a preferred embodiment, the processor 127 measures a signal quality metric for the baseband representation and compares the metric to a quality threshold. When the quality metric is below the threshold, the processor 127 instructs the controller 129, via a logic signal, to proceed with an uplink frequency transfer. The controller 129 generates a transfer message 203 and provides the transfer message 203 to the transmitter 201 for transmission to the subscriber unit via the downlink frequency.

In a TDMA communication system, the receiver 200 might also measure the interference or noise contained in unused time slots conveyed at the current uplink frequency. In this case, the processor 127 approximates the level of interference in the time slot containing the uplink communication signal as the average level of interference measured in the unused time slots and uses the measured interference level to compute the quality metric. A detailed discussion of this alternate technique is described below with regard to FIG. 3.

FIG. 3 illustrates a TDM time frame 300 containing a plurality of time slots 302–309 transmitted at an uplink frequency by a plurality of subscriber units in accordance with the present invention. As described above with regard to FIG. 1, a TDM uplink communication signal transmitted by a subscriber unit (e.g., unit 103 in FIG. 1) preferably occupies one of the time slots (e.g., 305). The other occupied time slots 302, 306–309 contain TDM uplink communication signals transmitted by other subscriber units (e.g., units 104–108 in FIG. 1). In a preferred embodiment, the base unit measures a quality metric for at least one of the TDM uplink communication signals contained in the occupied time slots 302, 305–309 and compares the quality metric to a quality threshold to determine when to transfer the TDM uplink communication signals from the current uplink frequency to an alternate uplink frequency. In an alternate embodiment, the base unit might measure interference contained in one, or both, of the unoccupied time slots 303, 304 using a received signal strength indication (RSSI) and determine the quality metric for the TDM uplink communication signals contained in occupied time slots 302, 305–309 based on the measured interference level. Thus, when the interference level in an unoccupied time slot (e.g., 304) rises above a prescribed level, the quality metric (e.g., C/I) of the current uplink frequency is correspondingly below the quality threshold. Upon detecting the increased level of interference in the unoccupied time slot 304, the base unit transmits a transfer message to the subscriber units transmitting in the occupied time slots 302, 305–309 that directs the subscriber units to transfer their respective TDM uplink communication signals to an alternate uplink frequency, without changing the downlink frequency. In a preferred embodiment, the subscriber units transfer the TDM uplink communication signals to the alternate uplink frequency simultaneously. In an alternate embodiment, the transfer of each of the TDM uplink communication signals might occur independently, prior to a subsequent transmission by the corresponding subscriber unit.

The present invention provides a technique for transferring an uplink communication signal from one uplink frequency to another uplink frequency to mitigate the effects of interference at the original uplink frequency. This transfer is accomplished without changing the downlink frequency and, therefore, without disrupting existing communications at the downlink frequency. In contrast to existing techniques for mitigating ingress interference, the present invention provides for more efficient use of the allocated spectrum in a two-way cable communication system, while minimizing service disruptions due to time delays in identifying and isolating the sources of the ingress interference. Further, in a TDMA system, the present invention provides for the simultaneous transfer of multiple TDM uplink communication signals from a corrupted uplink frequency to a higher quality uplink frequency, thereby reducing the switching requirements of the base unit.

FIG. 4 illustrates a logic flow diagram 400 of steps executed to mitigate interference in a communication system in accordance with a preferred embodiment of the present invention. The logic flow begins (401) when a base unit receives an uplink communication signal from a subscriber unit at an uplink frequency. The base unit then determines (403) a quality metric for the uplink frequency. As discussed above with regard to FIG. 1, the quality metric preferably comprises a signal-to-noise ratio or a carrier-to-interference ratio.

Continuing, the base unit compares (407) the quality metric to a quality threshold. When the quality metric is greater than or equal to the quality threshold, the base unit continues (409) to receive the uplink communication signal from the subscriber unit at the current uplink frequency and the logic flow ends (411). However, when the quality metric is less than the quality threshold, the base unit generates a transfer message and transmits (413) the transfer message to the subscriber unit via a downlink frequency. The transfer message is preferably a digital word that instructs the subscriber unit to transfer the transmission of the uplink communication signal from the current uplink frequency to an available (i.e., unused) alternate uplink frequency. Upon receipt of the transfer message, the subscriber unit transfers (415) the uplink communication signal to the alternate uplink frequency, while the downlink frequency (i.e., the frequency received by the subscriber unit) remains unchanged, and the logic flow ends (411).

FIG. 5 illustrates a logic flow diagram 500 of steps executed to mitigate interference in a communication system in accordance with a first alternate embodiment of the present invention. The logic flow begins (501) when a base unit receives (503) an uplink communication signal from a subscriber unit at a first uplink frequency. The base unit then determines (505) a quality metric (e.g., C/I) for the first uplink frequency.

Next, the base unit determines (507) a quality metric for a second uplink frequency that is distinct from the first uplink frequency. In a preferred embodiment, this determination comprises measuring a level of interference at the second uplink frequency, when the second uplink frequency is not being used to convey an uplink communication signal, and computing an estimated carrier-to-interference ratio for the second uplink frequency based on the determined interference level and the power level of the uplink communication signal received by the base unit at the first uplink frequency. For example, the base unit might measure a level of interference at the second uplink frequency of −10 decibels above a millivolt (dBmV) using an RSSI measurement and a power level of 10 dBmV for the uplink communication signal at the first uplink frequency also using an RSSI measurement to compute an estimated carrier-to-interference ratio of 20 dB for the second uplink frequency.

When the quality metric of the first uplink frequency is greater than or equal to the quality metric of the second uplink frequency (509), the base unit continues (511) to receive the uplink communication signal at the first uplink frequency and the logic flow ends (513). However, when the quality metric of the first uplink frequency is less than the quality metric of the second uplink frequency (509), the base unit transmits (515) a transfer message to the subscriber unit via the downlink frequency at which the base unit is presently communicating with the subscriber unit. When the subscriber unit receives the transfer message, the subscriber unit and the base unit transfer (517) the uplink communication signal from the first uplink frequency to the second uplink frequency, while the downlink frequency remains unchanged, and the logic flow ends (513).

FIG. 6 illustrates a logic flow diagram 600 of steps executed to mitigate interference in a communication system in accordance with a second alternate embodiment of the present invention. The logic flow begins (601) when a base unit receives (603) an uplink communication signal from a subscriber unit at a first uplink frequency. The base unit then determines (605) a quality metric for a second uplink frequency that is distinct from the first uplink frequency. Like the quality metric determination for the second uplink frequency discussed with regard to FIG. 5, this determination is preferably based on measuring a level of interference at the second uplink frequency using RSSI techniques, when the second uplink frequency is not being used to convey an uplink communication signal.

When the quality metric of the second uplink frequency is less than or equal to a quality threshold (607), the base unit continues (609) to receive the uplink communication signal at the first uplink frequency and the logic flow ends (611). However, when the quality metric of the second uplink frequency is greater than the quality threshold (607), the base unit transmits (613) a transfer message to the subscriber unit via the downlink frequency at which the base unit is presently communicating with the subscriber unit. When the subscriber unit receives the transfer message, the subscriber unit and the base unit transfer (615) the uplink communication signal from the first uplink frequency to the second uplink frequency, while the downlink frequency remains unchanged, and the logic flow ends (611).

The present invention encompasses a method and apparatus for mitigating interference in a communication system that includes a base unit and one or more subscriber units. With this invention, ingress interference that is conducted or radiated into a two-way cable communication system can be mitigated without sacrificing system capacity or without disrupting communication services. In contrast to the prior art, the present invention permits utilization of the complete uplink cable communication frequency band and provides for continuous communication service by transferring an uplink communication signal to an alternate uplink frequency when the original uplink frequency is detrimentally impacted by ingress interference. Further, in a TDMA system, the present invention provides for the simultaneous uplink transfer of multiple TDM uplink communication signals, thereby reducing the switching requirements of the base unit.

What is claimed is:

1. A method for mitigating interference in a two-way communication system having one or more upstream and downstream channels, comprising:

monitoring ingress interference levels on the one or more upstream channels;

generating a list of available upstream channels based on a predetermined level of ingress interference on the one or more upstream channels;

switching, based on the ingress interference level present on the first upstream channel, communications from a first upstream channel to a second upstream channel while maintaining a same downstream frequency that was used with the first upstream channel, wherein the second upstream channel is chosen from the generated list of acceptable upstream channels;

removing the second upstream channel from the generated list; and adding the first upstream channel to the generated list of available upstream channels.

2. A two-way communication system having one or more upstream and downstream channels, comprising:

a monitor for measuring ingress interference levels on the one or more upstream channels and generating a list of available upstream channels based on a predetermined level of ingress interference on the one or more upstream channels;

a base and receiver unit for switching, based on the ingress interference level present on the first upstream channel, communications from a first upstream channel to a second upstream channel while maintaining a same downstream frequency that was used with the first upstream channel, wherein the second upstream channel is chosen from the generated list of acceptable upstream channels; and a controller for removing the second upstream channel from the generated list and for adding the first upstream channel to the generated list of available upstream channels.

* * * * *